United States Patent [19]

Peters et al.

[11] 4,101,315
[45] Jul. 18, 1978

[54] RECOVERY OF SILVER FROM CUPROUS CHLORIDE SOLUTIONS BY CO-CRYSTALLIZATION WITH SODIUM CHLORIDE

[75] Inventors: Mark A. Peters, Arvada; Robert K. Johnson, Lakewood, both of Colo.

[73] Assignee: Cyprus Metallurgical Processes Corporation, Los Angeles, Calif.

[21] Appl. No.: 759,846

[22] Filed: Jan. 17, 1977

[51] Int. Cl.$^2$ .................... C22B 15/12; C22B 11/04; C01G 5/00
[52] U.S. Cl. .................... 75/104; 75/108; 75/117; 75/118 R; 75/109; 423/34; 423/42; 423/493
[58] Field of Search .................... 23/296, 300, 302 R, 23/303, 305 R; 423/34, 38, 42, 197, 491, 493, 499; 75/108, 117, 118, 104, 109

[56] References Cited

U.S. PATENT DOCUMENTS

| | | | |
|---|---|---|---|
| 176,813 | 5/1976 | Rogers | 423/24 |
| 3,323,875 | 6/1967 | Been | 23/302 |
| 3,655,333 | 4/1972 | Stenger | 23/303 |
| 3,885,921 | 5/1975 | Matsamoto | 23/305 |
| 3,972,711 | 8/1976 | Goens et al. | 423/493 |

OTHER PUBLICATIONS

Mellor, *Inorganic and Theoretical Chemistry*, vol. 3, Longmans Green, pp. 162, 163.

*Primary Examiner*—O. R. Vertiz
*Assistant Examiner*—Brian E. Hearn
*Attorney, Agent, or Firm*—Sheridan, Ross, Fields & McIntosh

[57] ABSTRACT

A process for recovering silver present in cuprous chloride solutions as a soluble silver chloride which comprises saturating the cuprous chloride solution with sodium chloride, subjecting the saturated solution to evaporation to co-crystallize the sodium chloride and silver chloride, separating the solid chlorides from the liquid, recovering silver from the sodium chloride-silver chloride crystals and reclaiming the sodium chloride, adding water to the liquid and cooling it to crystallize cuprous chloride. The procedure is adaptable to processes for recovering copper from its ores in which copper is reduced to cuprous chloride in a leach slurry followed by cooling the leach slurry to crystallize out the cuprous chloride from which copper is recovered by conventional techniques.

13 Claims, 4 Drawing Figures

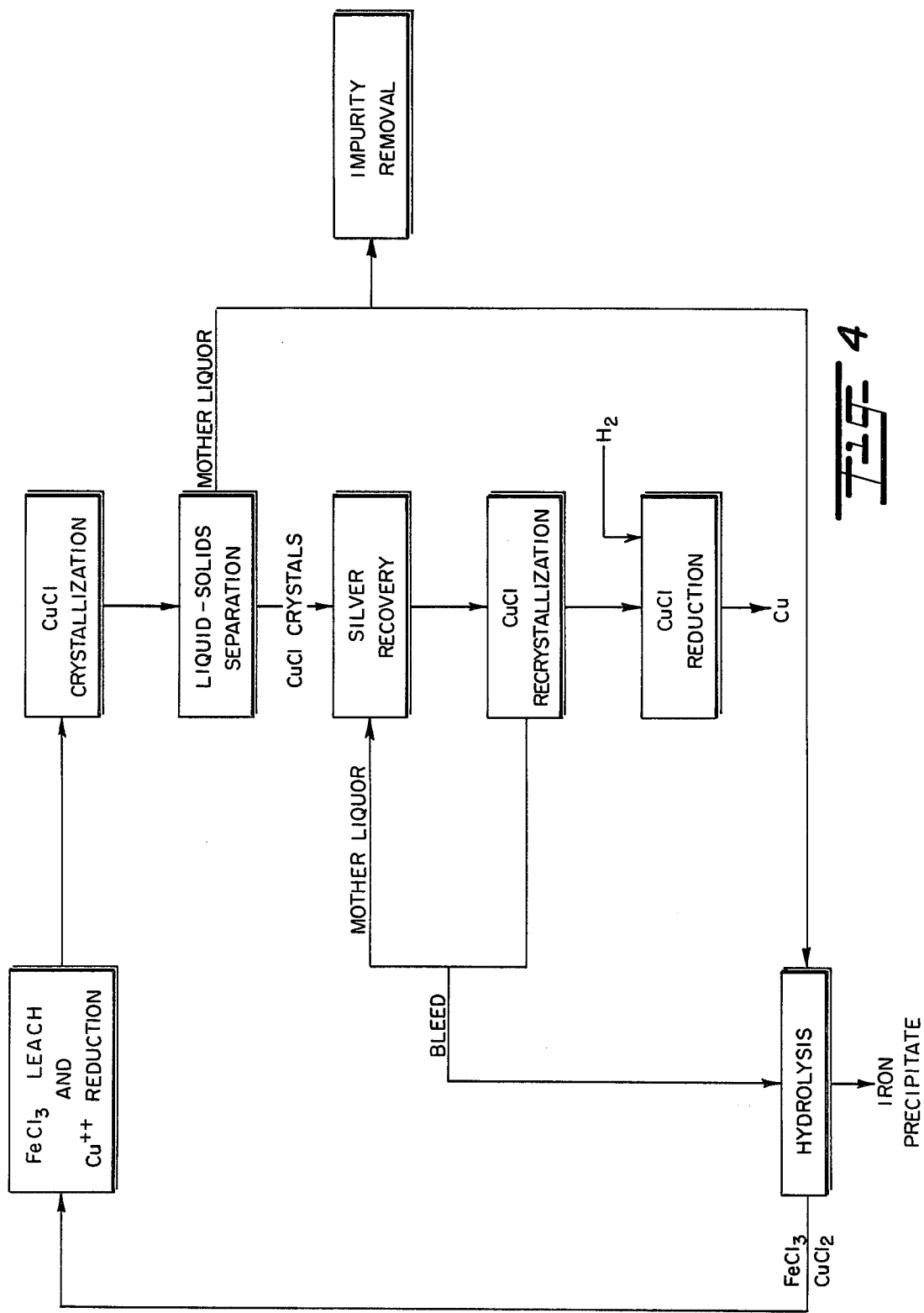

RECOVERY OF SILVER FROM CUPROUS CHLORIDE SOLUTIONS BY CO-CRYSTALLIZATION WITH SODIUM CHLORIDE

BACKGROUND OF THE INVENTION

1. Field of the Invention

The invention lies in the field of recovering silver from cuprous chloride.

2. Description of the Prior Art

In the recovery of copper from its ores, particularly sulfide ores, it is well known, as disclosed in U.S. Pat. Nos. 3,785,944, and 3,972,711, in order to avoid the disadvantages of recovering copper electrolytically, pyrometallurgically, and by other methods, to solubilize the copper in the ore as cuprous chloride in a leach followed by cooling the solution to crystallize out the cuprous chloride and recover copper from the cuprous chloride crystals. A major disadvantage of wet recovery like this technique, is that impurities like silver and iron are carried over during the crystallization into the cuprous chloride crystals and end up as impurities in the final copper product. Some of these impurities are deleterious to the properties of copper and reduce its sale value. While the latter may not be necessarily true of silver, the failure to recover the high priced silver so that it is not sold along with the copper at the price of copper, detracts from the economic feasibility of the overall process. Impurities, such as iron, can be removed from the recovered copper by fire refining in the presence of oxygen but this procedure results in the finished product containing oxygen which adversely affects its conductivity.

Accordingly, it is an object of this invention to provide an effective process for recovering silver and removing iron from cuprous chloride.

It is another object of this invention to provide an improvement in the process for recovering copper from its ores in which the copper is solubilized as cuprous chloride, the cuprous chloride crystallized out and the copper recovered from the cuprous chloride crystals, the improvement being a procedure for recovering silver from the cuprous chloride crystals before copper is recovered from them.

SUMMARY OF THE INVENTION

The invention is based on the discovery that sodium chloride and cuprous chloride can be recovered from solution by selective crystallization and that silver chloride co-crystallizes with the sodium chloride. Accordingly, the invention comprises saturating a cuprous chloride solution containing silver as silver chloride with sodium chloride, co-crystallizing sodium chloride and silver chloride by evaporative crystallization without the crystallization of cuprous chloride, separating the liquid and solid chlorides, diluting the liquid with water to change the concentration of the solution from a region of sodium chloride solid phase to one of cuprous chloride solid phase accompanied by cooling to crystallize cuprous chloride from which copper is recovered. The process may be performed continuously by returning the sodium chloride, after removal of silver chloride from which silver is recovered, to the circuit to resaturate the mother liquor and continuously adding cuprous chloride at the rate at which it is removed.

Although the invention is applicable to cuprous chloride from any source, it is particularly adaptable to processes for recovering copper from its sulfide ores containing silver in which process the copper is solubilized as cuprous chloride in a leach slurry followed by crystallization of the cuprous chloride with recovery of copper from the crystals, the invention being to remove silver from the crystals before copper is recovered from them by reduction or otherwise.

BRIEF DESCRIPTION OF THE DRAWING

FIG. 4 is a schematic flow diagram showing the incorporation of the silver recovery method of the invention into the flowsheet of a typical process as disclosed in U.S. Pat. No. 3,972,711 for recovering copper from its sulfide ores.

DESCRIPTION OF THE PREFERRED EMBODIMENTS

Figure 1:
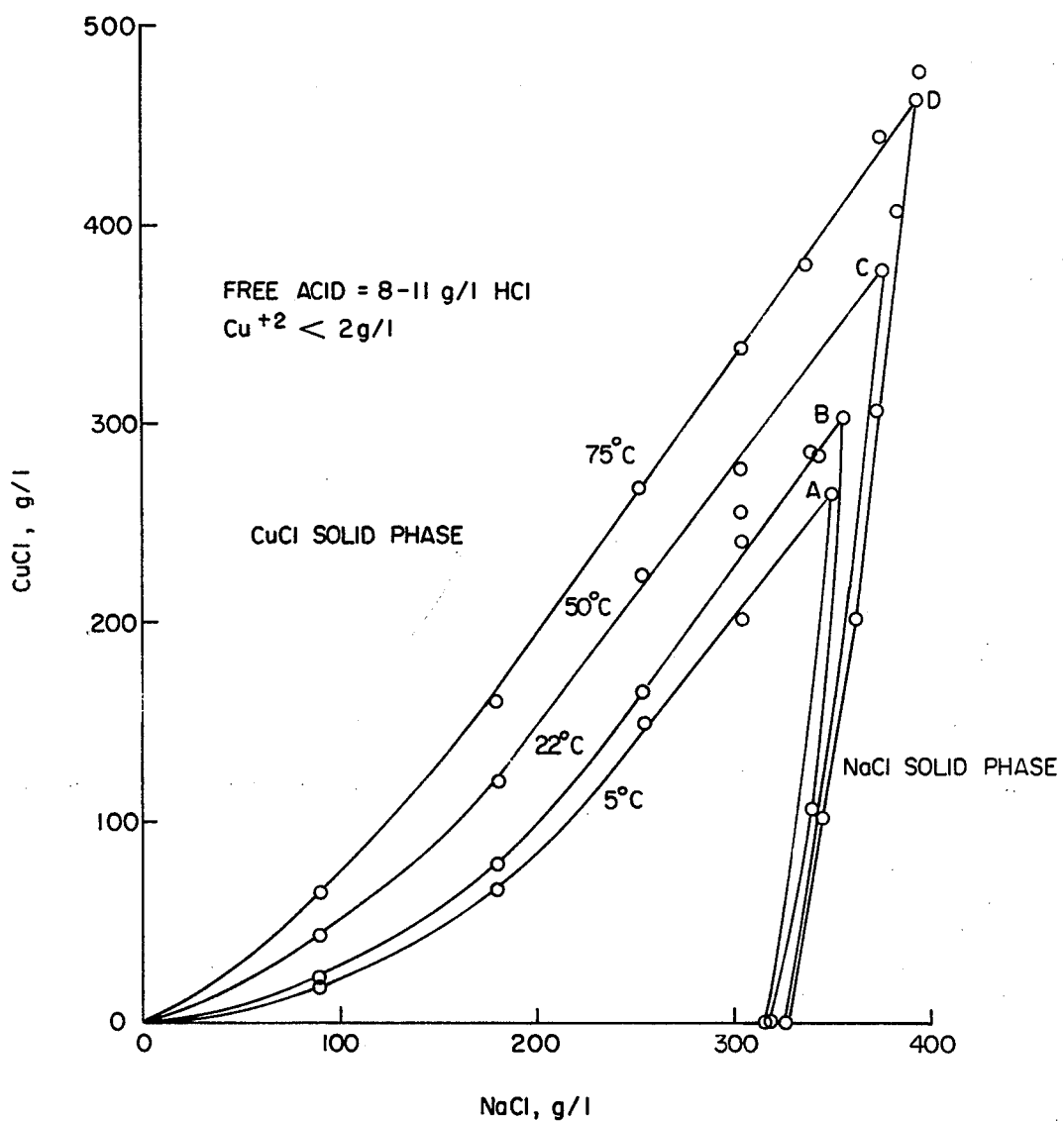
FIG. 1 is a solubility diagram for the system CuCl-NaCl-$H_2O$.
Figure 2:
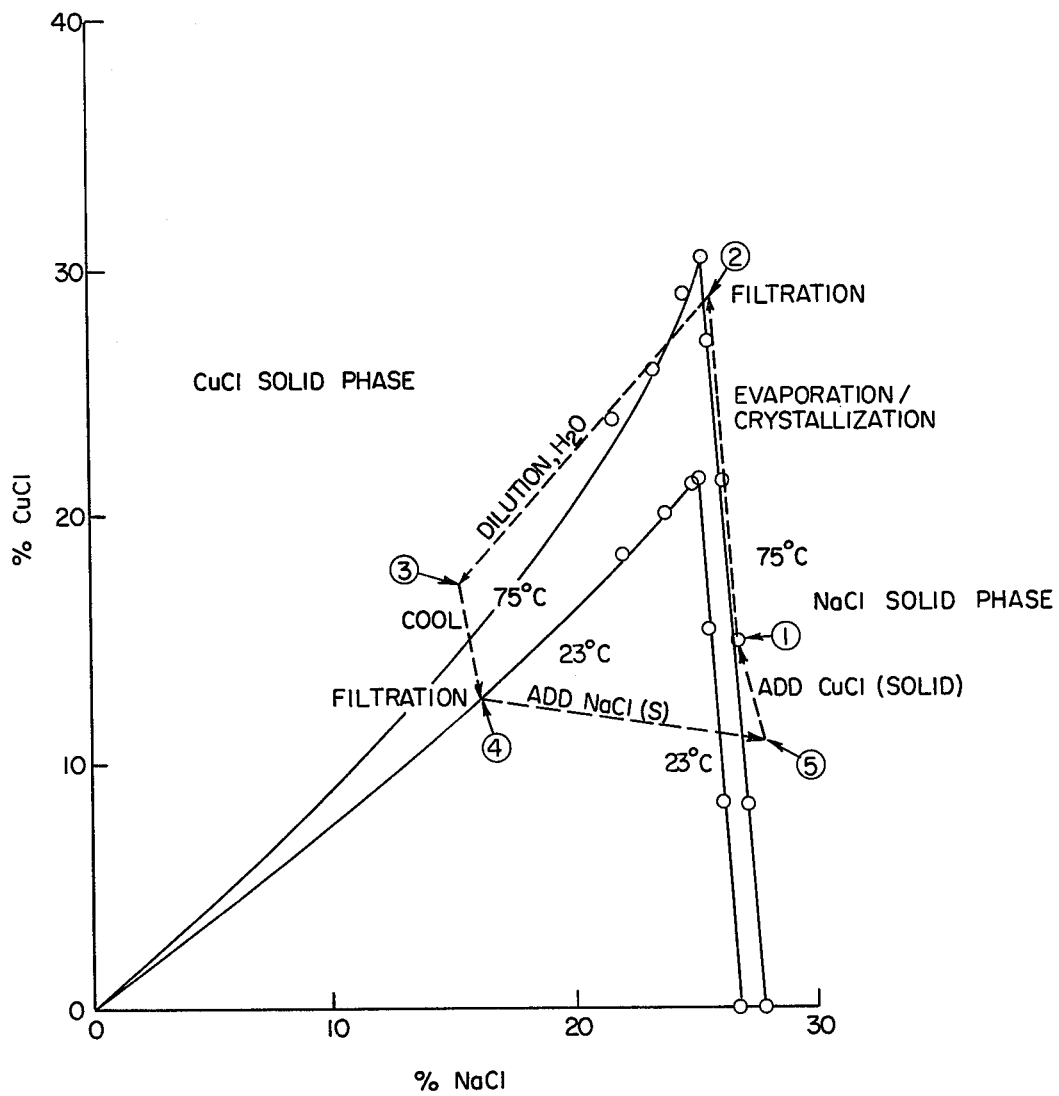
FIG. 2 is a solubility diagram based on the graph of FIG. 1 in which a series of process steps (represented by the dotted lines) for a selected set of conditions of temperature and concentrations of CuCl and NaCl have been selected to illustrate the operation of the process of the invention.

Reference is now made to FIGS. 1 and 2 for a description of the physical phenomena upon which the operation of the invention is based, the graphs being based on experimental results. The graph of FIG. 1 shows the existence of double points for each temperature studied where both solid phases (CuCl and NaCl) co-exist. All data points to the left of a line connecting the double points were determined with the cuprous chloride solid phase present and to the right of the line with the sodium chloride solid phase present. The curve shows, for example, that if 300 g/l sodium chloride solution saturated in cuprous chloride at 75° C is cooled to 5° C, a crop of 130 g/l cuprous chloride should crystallize. If a 180 g/l CuCl solution saturated in NaCl at 75° C is cooled to 5° C, a crop of 20 g/l NaCl should crystallize.

Referring to FIG. 2, paths 4 to 5 and 5 to 1 represent additions of sodium chloride and cuprous chloride to the circuit in amounts equal to those removed from the circuit. Evaporative crystallization is represented by path 1 and 2. After crystallization of sodium chloride high in silver chloride, a liquid-solids separation is performed. Paths 2 to 3 and 3 to 4 represent dilution with water to change the concentrations from a region of sodium chloride solid phase to one of cuprous chloride solid phase accompanied by cooling to recover a crop of cuprous chloride crystals. For illustrative purposes, the conditions shown in FIG. 2 resulted in about 80% removal of silver. Obviously, the amount of silver removed depends upon experimental conditions, such as concentration of sodium chloride or cuprous chloride or temperature.

The invention will now be described in more detail with reference to FIG. 3.

Cuprous chloride is shown at the beginning of the process as being introduced to the dissolution step in the form of crystals. The cuprous chloride feed contains silver and iron as impurities which are to be removed. In the dissolution step, the cuprous chloride is solubilized and the solution saturated with sodium chloride which is shown as being added as crystals and in mother liquor. The sodium chloride saturated cuprous chloride solution is evaporated to crystallize sodium and silver chlorides. This step is followed by a liquid-solids separation with the silver chloride-sodium chloride crystals going to a dissolution step and the mother liquor containing the cuprous chloride, after dilution, passes on to the cuprous chloride crystallizer where the temperature is reduced to crystallize the cuprous chloride crystals which are separated from the mother liquor and copper recovered from them.

After dissolution of silver chloride-sodium chloride crystals the solution is sent to copper cementation for silver recovery. The filtrate is evaporated to recover sodium chloride which is advanced to the cuprous chloride dissolution step.

Figure 3:
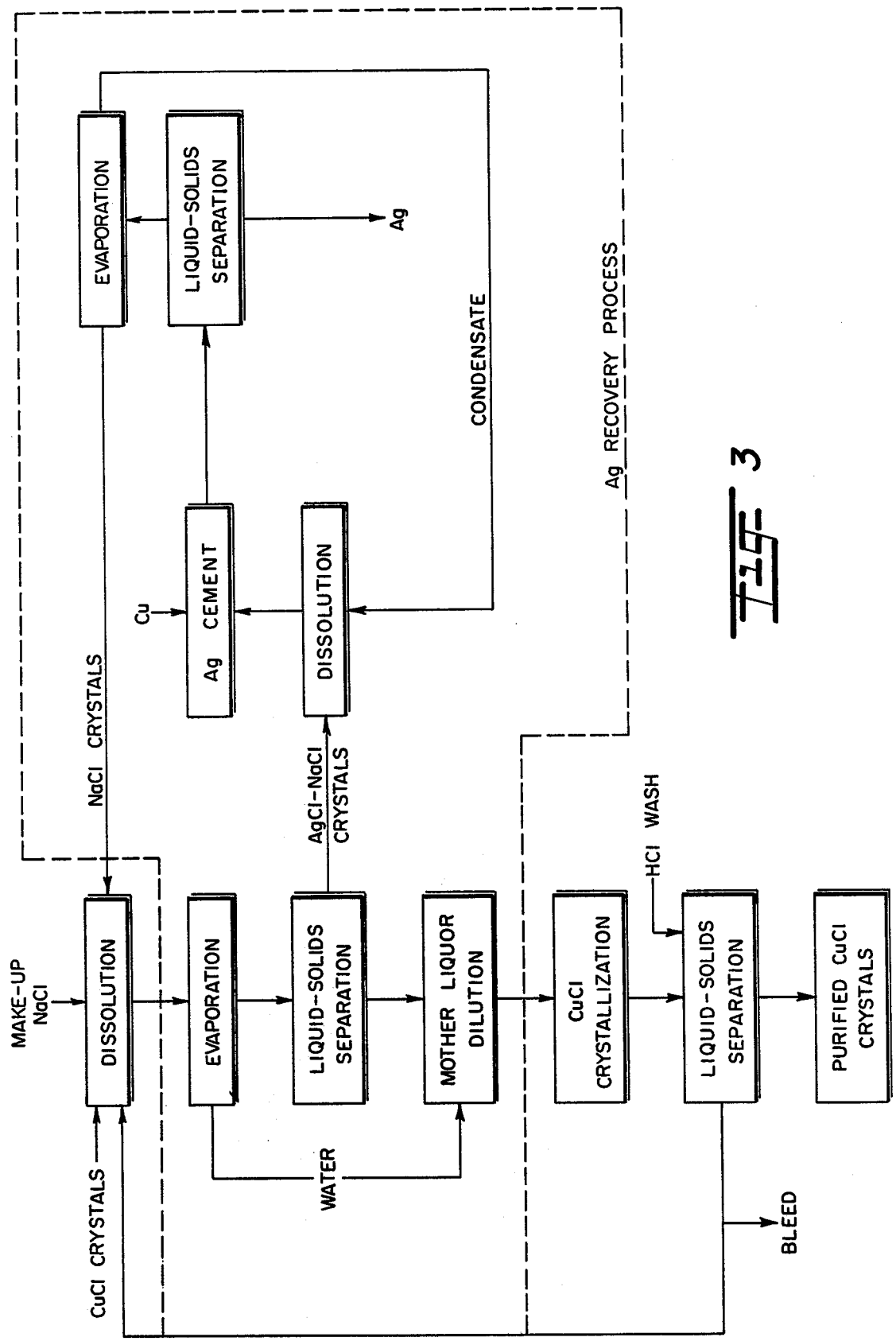
FIG. 3 is a flowsheet of a method of the invention showing a circuit for a continuous process.

If the silver removal process is to be incorporated into a typical process for the recovery of copper from a copper sulfide feed as shown in FIG. 4, the silver removal procedure shown in FIG. 3 will be incorporated into the flowsheet as shown, prior to the recrystallization of cuprous chloride crystals. In the flowsheet of FIG. 4 mother liquor is shown schematically as being bled from the silver removal step to the hydrolysis step where it may be used to supply sodium to precipitate sodium jarosite.

The invention is illustrated by the results of eight examples set forth in Table 1 below, example 8 being a comparative example in which sodium chloride and silver chloride were co-crystallized from a sodium chloride saturated solution by cooling from 80°–25° C rather than by evaporation used in the other seven examples.

The feed solution used for the examples was a synthetic solution made by adding the required amount of cuprous chloride, silver chloride and ferrous chloride to a water solution saturated at 80° C with sodium chloride at pH 1. In some examples cupric copper was added to determine its effect on the efficiency of silver removal. This feed solution was maintained in the acid range.

The removal of sodium chloride crystals and co-crystallized silver chloride was accomplished by evaporating the feed liquor to the point where a portion of the dissolved sodium chloride crystallizes. The slurry was filtered to recover the silver chloride-rich sodium chloride crystals. The filtrate was diluted with hot water and cooled with agitation to recover CuCl crystals. The rates of cooling are variable, ambient cooling and rapid cooling being used. The cooled crystals were then filtered and subjected to variable washing cycles and reslurry procedures. The recovered cuprous chloride crystals are dried with acetone.

TABLE 1

Recovery of Ag From NaCl-CuCl Solutions (Temperature 80° C)

| Test No. | Supernatant Analyses | | | | | Volume Reduction of Slurry % | % of Added NaCl Crystallized | Product (NaCl) | | | | % Ag Removed |
| | Ag g/l | Cu(Total) g/l | Cu++ g/l | Fe++ g/l | NaCl g/l | | | Ag ppm | Fe ppm | NaCl % | Cu % | |
| --- | --- | --- | --- | --- | --- | --- | --- | --- | --- | --- | --- | --- |
| 1 | 0.049 | 183 | 0 | 1 | 404 | 0-feed | 0 | | | | | 0 |
|  | 0.036 | 216 |  |  | — | 12.5 | 15 |  |  |  |  | 38 |
|  | 0.029 | 254 |  |  | 381 | 25 | 29.0 | 220 | — | — | 3.98 | 58 |
| 2 | 0.054 | 127 | 4.5 | 1 | 371 | 0-feed |  |  |  |  |  |  |
|  | 0.02 | 284 | 14 |  | 399 | 46 | 54 | 210 | 320 | 100 | 0.56 | 82 |
| 3 | 0.024 | 122 | 0 | 1.2 | 348 | 0-feed |  |  |  |  |  |  |
|  | 0.010 | 286 | 4 | 1.3 | 398 | 46 | 53 | 100 | 340 | 96.3 | 0.046 | 80 |
| 4 | 0.154 | 122 | 0 | 1.2 | 353 | 0-feed |  |  |  |  |  |  |
|  | 0.051 | 282 | 6 | 1.3 | 386 | 46 | 53 | 630 | 460 | 96.3 | 0.24 | 80 |
| 5 | 0.050 | 122 | 0 | 10.6 | 338 | 0-feed |  |  |  |  |  |  |
|  | 0.014 | 304 | 9 | 13.9 | 358 | 46 | 61 | 210 | 600 | 98.3 | 0.14 | 94 |
| 6 | 0.054 | 135 | 13 | 1.2 | 350 | 0-feed |  |  |  |  |  |  |
|  | 0.018 | 322 | 25 | 1.3 | 386 | 46 | 59 | 200 | 410 | 95 | 0.25 | 79 |
| 7 | 0.054 | 152 | 30 | 1.2 | 350 | 0-feed |  |  |  |  |  |  |
|  | 0.016 | 324 | 48 | 1.3 | 376 | 46 | 59 | 220 | 330 | 95.8 | 0.10 | 86 |
| 8 | 0.051 | 122 | 0 | 1.2 | 354 | 0-feed |  |  |  |  |  |  |
|  | 0.045 | 124 | 0 | 1.2 | 353 |  | 1.6 | 900 |  |  | 0.052 | 11 |

It will be noted from the above Table 1 that up to 94% of silver was removed from starting solutions containing from 0.024 – 0.165 g/l of silver. Good silver recovery was obtained from solutions containing as much as 30 g/l of cupric copper showing that this impurity does not affect the recovery of silver. Likewise, ferrous iron present in amounts up to about 10.6 g/l does not affect recovery of silver.

Example 8 is a comparative example in which crystallization was accomplished by cooling from 80°–25° C rather than by evaporation, and it will be noted that only 11% of the silver was removed. If a greater percentage of silver is to be removed from the solution, more NaCl must be crystallized and this illustrates the need for an evaporative crystallization procedure. Another comparative example not listed in Table 1 of crystallization by cooling is described below.

If the cooling is conducted in the presence of a high ferrous iron solution saturated in sodium chloride a larger percentage of silver will be co-crystallized with the sodium chloride. For example, if a 152 g/l sodium chloride, 186 g/l Fe++ and 0.036 g/l silver solution is cooled from 85°–25° C; 58% of the silver is co-crystallized with the sodium chloride. The subsequent production of cuprous chloride crystals will however produce a cuprous chloride crop contaminated with iron. This illustrates the importance of utilizing a sodium chloride solution low in ferrous iron for crystallization.

It was found that the recrystallization of cuprous chlorides as carried out in this process (i.e., in a NaCl system) reduced the iron content of the cuprous chloride from typically 220 ppm to 10 ppm. Accordingly, it is an advantage of the invention that the silver removal process additionally results in a reduction in the iron content of the final cuprous chloride crystals.

Various changes were made in the experimental procedure without appreciable change in results. These included the addition of powdered sodium chloride, ferrous iron and cupric iron; NaCl crystallization in three evaporation stages; slow evaporation and fast evaporation. It was also found that regardless of the amount of silver present, the percentage of silver removed is in direct proportion to the amount of sodium chloride which is crystallized.

After the silver is removed as silver chloride by evaporative crystallization of sodium chloride, the filtrate is diluted with water at 80° C to move to the cuprous chloride solid-phase region. As an example, the filtrate was diluted with water until cuprous chloride began to crystallize at 80° C. The solution (0.017 g/l silver, 335 g/l sodium chloride, 360 g/l cuprous chloride, 80° C) was cooled to 25° C and the resultant cuprous chloride crop contained 15 ppm silver, less than 10 ppm iron and 140 ppm sodium.

If the silver is not removed from these solutions of a typical flowsheet (FIG. 4), for example, it will eventually all be removed by the cuprous chloride. The physical phenomena responsible for this has been determined experimentally. A portion of the dissolved Ag co-crystallized with the CuCl and a linear relationship was found between the concentration of silver in the hot feed soluton and the silver in the resulting cuprous chloride crystals. This relationship was maintained for a variety of feed solutions: $CuCl_2$, HCl, NaCl, $FeCl_2$. Therefore, recrystallization of cuprous chloride from any of these systems did not offer a silver recovery route and illustrates the need for a silver removal scheme.

It is thus seen from the above description that a process has been provided for removing silver impurity from cuprous chloride, the process being applicable to processes for recovering copper from its ores in which the copper is reduced to cuprous chloride in a leach slurry, the cuprous chloride crystallized out and copper recovered from the cuprous chloride crystals.

What is claimed is:
1. A process for recovering silver chloride and cuprous chloride from solution which comprises:
  (a) adding sodium chloride to the solution;
  (b) heating the solution to drive off water to co-crystallize sodium chloride and silver chloride followed by a liquids-solids separation to separate the crystallized sodium and silver chlorides from the cuprous chloride solution;
  (c) recovering silver from the crystallized silver chloride;
  (d) adding water to the cuprous chloride solution to change the concentration from a region of sodium chloride solid phase to one of cuprous chloride solid phase accompanied by cooling the solution to crystallize cuprous chloride.
2. The process of claim 1 in which the cuprous chloride solution is that resulting from the reduction of cupric ion with copper sulfide ore.
3. The process of claim 2 in which the copper sulfide ore is chalcopyrite.
4. The process of claim 1 in which prior to co-crystallization the concentrations of sodium chloride and cuprous chloride are adjusted to lie on any point of the solubility curve in the sodium choloride solid phase region.

5. In the process for recovering copper from its ores containing iron and silver in which the copper is reduced to the cuprous form in a leach liquor and recovered as cuprous chloride by crystallization, the improvement of recovering silver from the leach liquor and producing cuprous chloride crystals substantially free of iron and silver which comprises:
  (a) adding sodium chloride to the leach liquor;
  (b) evaporating the leach liquor to co-crystallize sodium chloride and silver chloride;
  (c) separating the crystallized sodium and silver chlorides from the leach liquor;
  (d) adding water to the leach liquor to change the conditions of temperature and concentration from a region of sodium chloride solid phase to one of cuprous chloride solid phase, and
  (d) cooling the leach liquor to crystallize cuprous chloride substantially free of iron and silver impurities.
6. The process of claim 5 in which silver is recovered from the recovered silver chloride.
7. The process of claim 5 in which the ore is a copper sulfide ore.
8. The process of claim 7 in which the copper ore is chalcopyrite.
9. The process of claim 8 in which the copper is reduced to the cuprous form by leaching the chalcopyrite with cupric chloride.
10. A process for recovering substantially silver and iron free copper from copper ores containing silver and iron which comprises:
  (a) reducing the copper in the ore to the cuprous form by leaching the ore with ferric chloride and cupric chloride to form a leach liquor containing the cuprous chloride;
  (b) crystallizing the cuprous chloride from the leach liquor and recovering the formed crystals of cuprous chloride;
  (c) reducing the cuprous chloride crystals to solution;
  (d) adding sodium chloride to the cuprous chloride solution;
  (e) evaporating the cuprous chloride solution to co-crystallize the silver and sodium chlorides;
  (f) separating the solution from the precipitated chlorides;
  (g) adding water to the cuprous chloride solution to change the concentration of the solution from a region of sodium chloride solid phase to a region of cuprous chloride solid phase accompanied by cooling said cuprous chloride solution to crystallize said cuprous chloride, and
  (h) recovering copper from said cuprous chloride crystals.
11. The process of claim 10 in which silver is recovered from the recovered silver chloride.
12. The process of claim 10 in which the ore is a sulfide ore.
13. The process of claim 12 in which the ore is chalcopyrite.

* * * * *